Figure 1:
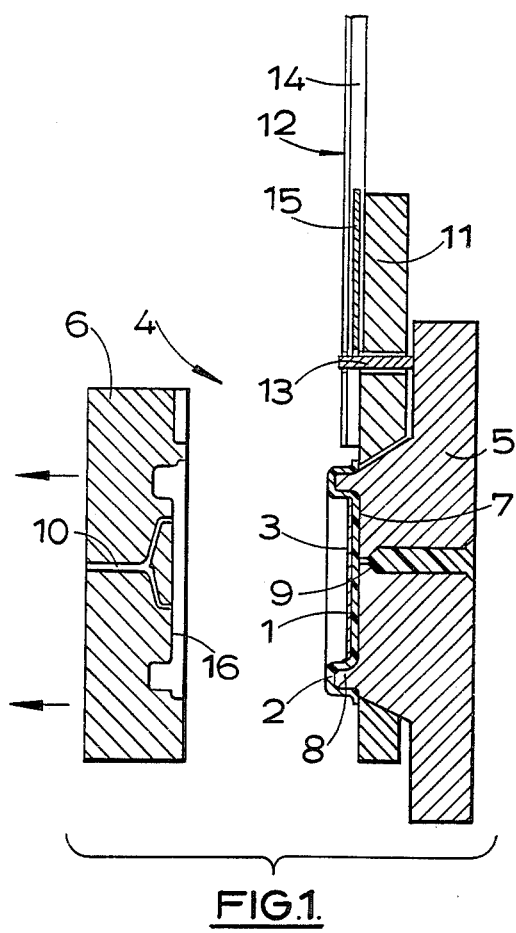

United States Patent [19]

Bagnall et al.

[11] Patent Number: 4,710,338
[45] Date of Patent: Dec. 1, 1987

[54] METHOD OF MANUFACTURING A MOLDED PLASTICS ARTICLE INCORPORATING A BLANK OF SHEET

[75] Inventors: Paul J. H. Bagnall, Admaston; Norman Whiteley, Walsall, both of England

[73] Assignee: Peerless Plastics Packaging Limited, Great Britain

[21] Appl. No.: 929,989

[22] Filed: Nov. 10, 1986

[51] Int. Cl.⁴ .................. B29C 31/08; B29C 45/14
[52] U.S. Cl. .................. 264/509; 264/510; 264/247; 264/259; 264/266; 425/126 R
[58] Field of Search ............ 264/509, 247, 259, 266, 264/275, 510, 511, 297.2; 425/126 R, 126 S

[56] References Cited

U.S. PATENT DOCUMENTS 3,463,845 8/1969 De Pass et al. ............ 425/129 R X
4,025,255 5/1977 Sutch .................. 425/126 R X
4,149,838 4/1979 Sutch .................. 264/266 X Primary Examiner—Jan H. Silbaugh
Assistant Examiner—Yun H. Wang
Attorney, Agent, or Firm—Leydig, Voit & Mayer

[57] ABSTRACT

A plastics article, for example a container lid, in which a blank 3 of sheet material is incorporated, as a label or diffusion barrier, as the article is moulded is manufactured in an injection mould the mould cavity of which contains a recess 7 into which the blank is received prior to injection of the plastics material. The blank is dropped from holder means externally of the mould cavity, preferably during relative closing movement between the mould halves 5, 6 and is caused to enter into the recess as it falls. The blank may be held in a guide track 12 or chute directed down into the mould cavity and be restrained by a stop 13 from falling until required to do so. Air may be applied to the blank as it falls to direct it into the recess.

19 Claims, 3 Drawing Figures

U.S. Patent    Dec. 1, 1987    Sheet 1 of 2    4,710,338

METHOD OF MANUFACTURING A MOLDED PLASTICS ARTICLE INCORPORATING A BLANK OF SHEET

This invention relates to improvements in the manufacture of moulded plastics articles which have a blank of sheet material, which may for example be a label or serve as a diffusion barrier, incorporated in them as they are moulded.

When the blank of sheet material is smaller in its flat state than the area of the mould cavity where the halves of an injection mould meet there is the problem of locating and retaining the blank in the correct position for the moulding process. A common practice at present in automated moulding processes is for the blank to be inserted by a robotic arm between the mould halves whilst the mould is open for the ejection of a moulded article produced in the preceding moulding operation, and then to draw the blank by suction against one of the mould halves to hold it in position as the robotic arm is withdrawn, the mould closed and during the moulding of the article. The use of the robotic arm to insert the blank extends the moulding cycle time significantly over that taken for moulding an article which does not incorporate a blank. Accordingly the production rate is reduced.

The present invention seeks to save time in positioning a blank in an injection mould for incorporation in a moulded article.

According to the present invention there is provided a method of manufacturing a moulded plastics article which incorporates a blank of sheet material smaller in size in its flat state than the area of the mould cavity where the halves of an injection mould in which the article is to be moulded meet, comprising the steps of placing the blank in holder means externally of the mould cavity above one of the mould halves containing a recess of the mould cavity which is to receive the blank, causing the blank to be released by the holder means when the mould halves are open so as to fall between the mould halves and causing the blank as it falls to be entered into the recess in the said one mould half, closing the mould when the blank is in the recess, forcing a thermoplastics material into the mould cavity and on to the blank, and when the material has cooled to form a solidified plastics article removing the article incorporating the blank from the mould cavity.

In a continuous process in which moulding cycles follow successively directly one after another, the blank to be used in a moulding cycle can be arranged to be released to fall between the mould halves as soon as the moulded article produced in the preceding cycle is ejected from the mould cavity. It may be arranged to fall during relative closing movement between the mould halves.

The blank may be caused to enter into the recess of the mould cavity by means of air which blows or sucks the blank into the recess. One or more air passages may be provided in the mould for the application of air at the cavity to blow or suck the blank into the recess. Instead, or additionally, air may be blown towards the recess from the exterior of the mould to direct the blank into the recess. Air may also be used to control the rate at which the blank falls into the recess. As a possible alternative to the use of air for causing the blank to enter into the recess, the holder means may be tilted with respect to the vertical so that when the blank is released the resultant path followed by the blank as it falls takes the blank without further assistance directly into the recess of the mould cavity.

By causing the blank to be released as soon as the moulded article of the preceding moulding cycle is ejected from the mould cavity, and causing the blank to be entered into the recess in the ways mentioned, the mould may be kept open for little or no more time than is required when moulding in a continuous process articles which do not incorporate blanks.

The holder means may comprise a guide track or chute above and directed down towards the mould cavity, and a stop at the guide track or chute which restrains the blank from falling until it is required to do so. The stop may be moved relative to the guide track or chute to allow the blank to fall, or means may be provided to disengage the blank from the stop to allow it to fall when required. Such movement of the stop or disengaging means may be linked with the operation of, for example, stripper or ejector means for ejecting moulded articles from the mould cavity, or with the movement of a moving half of the mould. The holder means may be mounted on the mould half containing the recess into which the blank is to be received, whether the fixed mould half or the moving mould half.

The blank may be placed in the holder means manually from a store of blanks but preferably a robotic arm or other automated feeder is provided, or a suitable conveyor, for feeding the blank, and other blanks for succeeding moulding cycles, to the holder means automatically from a store of blanks.

The method according to the present invention is applicable to the manufacture of containers, container lids and a variety of other articles which are to incorporate a blank of sheet material as a label, diffusion barrier or decorative feature. The blank may be of paper, board, plastics film, foil or possibly other material or composition of materials in sheet form, and may be square, rectangular, round or of various other shapes capable of being entered into the recess without hindrance. It will generally be desirable for the blank to be of a size such that in its flat state it occupies the full recess area when it is received into the recess and in that way will be exactly positioned for incorporation into the moulded article. However, one or more tabs, lugs or other projections may be provided at the periphery of the blank for engagement with one or more sides of the recess to position the blank in the recess if it does not occupy the full recess area. If exact positioning is not required then the blank may be smaller than the recess area and tabs, lugs or the like for positioning the blank in the recess are not required.

Figure 2:
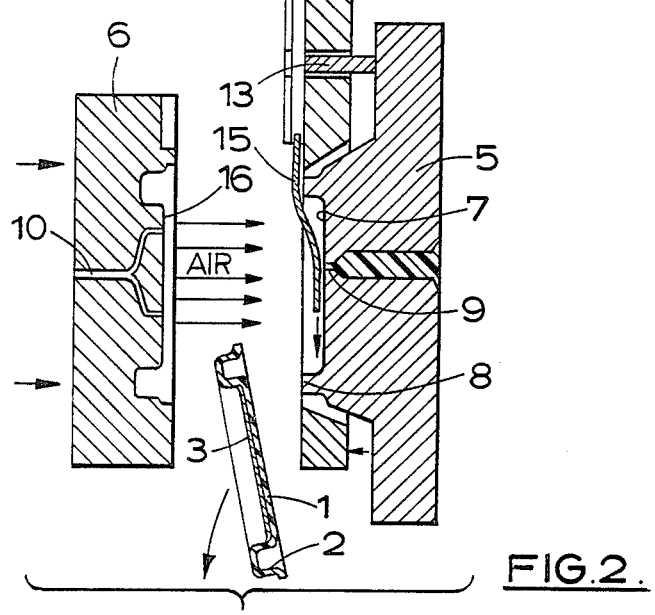
Figure 3:
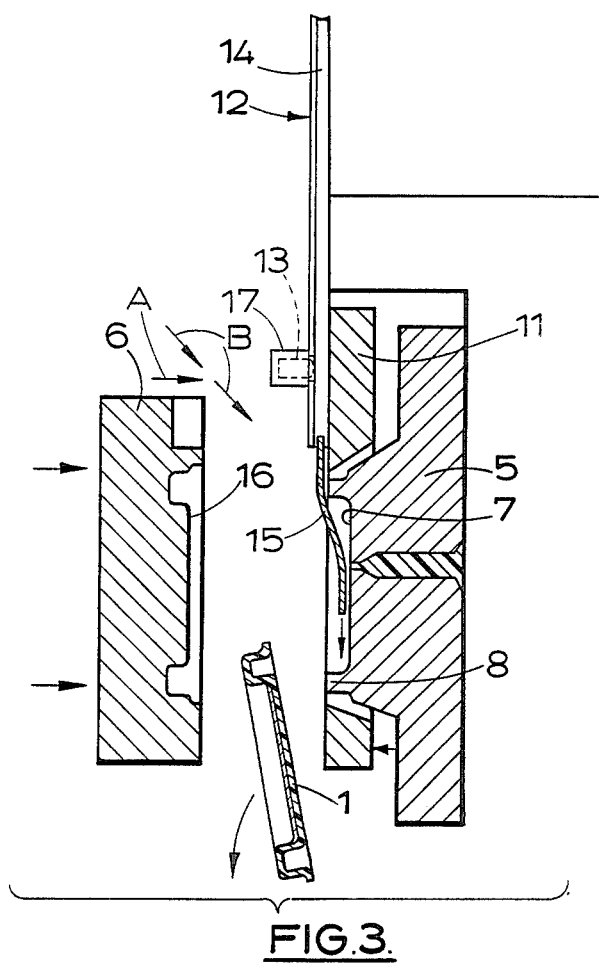

An embodiment of the invention will now be described by way of example with reference to the accompanying drawings in which:

FIG. 1 is a diagrammatic vertical central section through an open injection mould before a moulded article is ejected from the mould, FIG. 2 is a similar section but showing the mould just after the moulded article has been ejected, and FIG. 3 is a section similar to that of FIG. 2 showing a modification.

In this embodiment the method according to the present invention is applied to the manufacture of a lid for a container having, as can be seen in the accompanying drawings, a flat central portion 1 surrounded by a channel-section peripheral portion 2 which is intended to fit sealingly over the rim of the container to which the lid is to be applied in use. A label 3 is incorporated in the lid at the central portion 1.

Referring to FIGS. 1 and 2 of the drawings, the lid is moulded in an injection mould 4 comprising a fixed mould half 5 and a moving mould half 6 which define a mould cavity in the shape of the lid to be moulded. A recess 7 is formed in the fixed mould half 4 at which in the mould cavity the central portion 1 of the lid is produced. That recess 7 is smaller than the area of the mould cavity where the two mould halves meet and is surrounded by a continuous wall-like projection 8 which serves in defining the part of the mould cavity in which the channel-section peripheral portion 2 of the lid is produced. An orifice 9 in the fixed mould half 5 opens centrally into the recess 7. Liquified thermoplastics material is forced into the mould cavity by way of the orifice 9 in the moulding process. Air passages 10 in the moving mould half 6 open into the mould cavity opposite the recess 7 and are connected to a suitable air supply means for blowing air towards the recess.

On the fixed mould half 5 there is a stripper plate 11 which operates in known manner, possibly in conjunction with air blasts applied at the fixed mould half, to eject a moulding from the fixed mould half when the mould is opened at the end of a moulding cycle. The strippler plate is of conventional form except that it has a guide track 12 on its front face externally of the mould, and a stop peg 13 secured to the fixed mould half projects horizontally through the stripper plate to the guide track. The guide track 12 comprises a pair of parallel, opposed, angle section members 14 fixed to the stripper plate. It extends vertically directly above the mould cavity in line with the recess 7, and is of similar width to the recess. The stop peg 13 is of such a length that when the stripper plate is in a rearward inoperative position relative to the fixed mould half, as shown in FIG. 1, the stop peg extends across the guide track and forms an obstruction in the guide track, and when the stripper plate is moved to a forwardmost operative position relative to the fixed mould half, as shown in FIG. 2, the stop peg is clear of the guide track. In the forwardmost position of the stripper plate the guide track is brought into line with the front face of the wall-like projection 8 of the fixed mould half.

For a moulding operation a flat label blank 15, for example of printed paper, is inserted in the guide track 12 whilst the stripper plate 11 is in its inoperative position so that the label blank is held in the guide track by the stop peg 13.

A moulding cycle will now be described, beginning just as the mould is opening. As the moving mould half 6 approaches its fully open position the stripper plate 11 moves forwards to eject from the fixed mould half 5 a lid moulded in the previous moulding cycle. When the stripper plate is in its forwardmost position, by which time the recess 7 in the fixed mould half has been fully vacated by the ejected moulding, and the stop peg 13 is clear of the guide track, the label blank 15 which had been held in the guide track is released and falls between the mould halves. Simultaneously the air supply means is operated to blow air from the air passages 10 in the moving mould half 6 towards the recess 7. As the label blank falls it is deflected into the recess by the blown air. This is happening whilst the moving mould half begins to move back towards the fixed mould half. By the time the mould is closed the label blank is accurately positioned in the recess against the inner end face of the recess. The front face of the label blank is towards the moving mould half. The air supply means is switched off when the mould is closed.

During the closing movement of the mould half the stripper plate moves back to its inoperative position in which the stop peg 13 again obstructs the guide track. A label blank can then be placed in the guide track to be stored ready for the next moulding cycle.

Liquified thermoplastics material, for example low density polyethylene, is injected under pressure into the mould cavity through the orifice 9. The thermoplastics material forces the label blank 15 in the recess 7 against an opposing face 16 of the moving mould half. The thermoplastics material flows over the back of the label blank from its centre outwards, smoothing out any wrinkles on the label blank as it does so. When the mould cavity is filled the mould is cooled and the thermoplastics material solidifies forming a lid in the front face of which the label blank is embedded. The label blank becomes keyed to the thermoplastics material by impregnation of the material into the fibres of the paper during the injection of the material into the mould cavity. The front face of the label blank does not come into contact with the thermoplastics material at any stage, being forced against the opposing face 16 of the moving mould half by the injection pressure.

Finally, the mould is opened and the lid ejected by the stripper plate. As the lid is ejected the stored label blank in the guide track is released for the next moulding cycle.

In the finished lid the label is smooth and free from creases, wrinkles or air bubbles.

It will be understood that the operation of the stripper plate and the air supply means is conventionally linked for automatic control with the operating and closing of the mould. The label blanks may be loaded into the guide track automatically, for example by a robotic arm the operation of which is also linked with the opening and closing of the mould.

The air which is blown on to the label blank need only be at a low pressure to deflect the label blank into the recess as it falls from the guide track.

A modification is shown in FIG. 3 of the accompanying drawings. Instead of being on the stripper plate 11, and moving with the stripper plate, the guide track 12 is a fixture. The angle-section members 14 of which the guide track is comprised are secured to the fixed mould half 5 in line with the front face of the wall-like projection 8 of that mould half. In this arrangement the stop peg 13 is in a housing 17 supported by the angle-section members 14 and is reciprocably movable, for example pneumatically, between projected and retracted positions. In the projected position the stop peg 13 extends across the guide track to hold a label blank in the guide track, and in the retracted position it is withdrawn into the housing clear of the guide track, as shown, so as to release the label blank from the guide track. Operation of the stop peg to move it to the retracted position occurs when the stripper plate 11 reaches its forwardmost position. The operation may be controlled by automatic timing means or may be triggered by movement of the stripper plate or of the moving mould half 6. When the moving mould half closes against the fixed mould half the stop peg returns to its projected position ready for the next label blank to be stored in the guide track.

Also in the modification of FIG. 3 air is not blown from air passages in the moving mould half but is blown from an air supply, not shown, at the top of the exterior of the moving mould half. Some of this air is blown horizontally towards the fixed mould half, as indicated by arrow A, and some of the air is blown diagonally downwards towards the recess 7, as indicated by arrows B. As before, the air supply is operated as the label blank is released from the guide track and it is conveniently linked with the operation of the stop peg 13. The blown air directs the label blank into the recess 7 as it falls, and the horizontally blown air helps to control the rate at which the label blank falls into the recess such that it will not bounce as it engages with the wall-like projection 8 at the lowermost side of the recess.

We claim:

1. A method of manufacturing a moulded plastics article which incorporates a blank of sheet material smaller in size in its flat state than the area of the mould cavity where the halves of an injection mould in which the article is to be moulded meet along a vertically disposed parting plane comprising the steps of placing said blank in a vertically orientation in holder means externally of said mould cavity above one of said mould halves containing a recess of said mould cavity which is to receive said blank, causing said blank to be released by said holder means when said mould halves are open so as to fall edge-first between said mould halves and causing said blank as it falls to be entered transversly into said recess in said one mould half, closing said mould when said blank is in said recess, forcing a thermoplastics material into said mould cavity and on to said blank, and when said material has cooled to form a solidified plastics article removing said article incorporating said blank from said mould cavity.

2. A method according to claim 1 included in a continuous process in which moulding cycles follow successively directly one after another and wherein said blank to be used in a moulding cycle is released by said holder means to fall between said mould halves as soon as the moulded article produced in the preceding cycle is ejected from said mould cavity.

3. A method according to claim 1 wherein said blank is released by said holder means during relative closing movement between said mould halves.

4. A method according to claim 1 wherein said holder means comprises a guide track or chute above and directed down towards the mould cavity, and a stop at said guide track or chute which restrains said blank from falling until it is required to do so.

5. A method according to claim 4 wherein said stop is moved relative to said guide track or chute to allow said blank to fall.

6. A method according to claim 4 wherein said stop comprises a peg in a housing supported by said guide track or chute and movable between a projected position in which it is operative to restrain said blank from falling until it is required to do so, and a retracted position in which it is withdrawn into said housing and releases said blank.

7. A method according to claim 4 wherein said guide track or chute is moved relative to said stop to allow said blank to fall.

8. A method according to claim 4 wherein said guide track or chute is supported by stripper means movable relative to one of said mould halves to eject each said moulded article from said mould cavity and said stop is fixed on said mould half, the movement of said stripper means to eject said moulded article releasing said blank from said stop.

9. A method according to claim 4 wherein said guide track or chute is mounted on said mould half containing said recess.

10. A method according to claim 1 wherein said blank is caused to be entered into said recess as it falls by means of air which acts on said blank to direct it into said recess.

11. A method according to claim 10 wherein said air acts on said blank by way of one or more air passages in said mould.

12. A method according to claim 10 wherein said air is applied to said blank externally of said mould above said mould cavity.

13. A method according to claim 1 wherein said holder means is tilted with respect to the vertical such that when said blank is released by said holder means the resultant path followed by said blank as it falls takes said blank into said recess.

14. A method according to claim 1 wherein air is applied to said blank as it falls to control the rate at which said blank falls into said recess.

15. A method according to claim 1 wherein said blank is of a size such that in its flat state it occupies the full area of said recess when it is received into said recess.

16. A method according to claim 1 wherein said blank has a peripheral projection which engages with a side of said recess to position said blank in said recess.

17. A method according to claim 1 wherein automatically operated means feeds said blank into said holder means from a store of blanks.

18. A method according to claim 1 in which said moulded article manufactured is a container lid and said blank is incorporated in said lid as a label.

19. A method according to claim 18 wherein said lid has a flat central portion surrounded by a channel-section peripheral portion, said flat central portion being defined at said recess into which said blank is received.

* * * * *